United States Patent
Simkins

(10) Patent No.: US 11,040,452 B2
(45) Date of Patent: Jun. 22, 2021

(54) DEPTH SENSING ROBOTIC HAND-EYE CAMERA USING STRUCTURED LIGHT

(71) Applicant: ABB Schweiz AG, Baden (CH)

(72) Inventor: Matt Simkins, Redwood City, CA (US)

(73) Assignee: ABB Schweiz AG, Baden (CH)

( * ) Notice: Subject to any disclaimer, the term of this patent is extended or adjusted under 35 U.S.C. 154(b) by 191 days.

(21) Appl. No.: 15/991,828

(22) Filed: May 29, 2018

(65) Prior Publication Data

US 2019/0366552 A1 Dec. 5, 2019

(51) Int. Cl.
- *B25J 9/16* (2006.01)
- *G06K 9/20* (2006.01)
- *G06T 7/521* (2017.01)
- *G06K 9/00* (2006.01)

(52) U.S. Cl.
CPC ........ *B25J 9/1697* (2013.01); *G06K 9/00771* (2013.01); *G06K 9/209* (2013.01); *G06T 7/521* (2017.01); *G05B 2219/39008* (2013.01)

(58) Field of Classification Search
CPC ... G01B 11/254; G01B 11/25; G01B 11/2504; G01B 11/2513; G01B 11/2527; G01B 11/2545; G01B 11/02; G01B 11/14; G01B 11/026; B25J 9/1697; B25J 9/1692; B25J 9/1612; B25J 9/10; B25J 9/1664; B25J 9/0084; B25J 13/087; B25J 19/022–023; G05B 19/401; G06T 7/521; G06T 7/55; G06T 7/75; G06T 7/80; Y10S 901/47; Y10S 901/01; G06K 9/00201; G06K 9/4661
See application file for complete search history.

(56) References Cited

U.S. PATENT DOCUMENTS

| | | | |
|---|---|---|---|
| 6,101,455 A | 8/2000 | Davis | |
| 6,503,195 B1 | 1/2003 | Keller et al. | |
| 6,665,588 B2 * | 12/2003 | Watanabe | B23Q 7/04 414/796.5 |
| 7,151,848 B1 * | 12/2006 | Watanabe | B25J 9/1656 382/141 |
| 7,176,440 B2 | 2/2007 | Cofer et al. | |

(Continued)

FOREIGN PATENT DOCUMENTS

| | | |
|---|---|---|
| CN | 103925879 A | 7/2014 |
| CN | 104613899 A | 5/2015 |

(Continued)

OTHER PUBLICATIONS

Patent Cooperation Treaty, International Search Report and Written Opinion in corresponding application No. PCT/US19/33513, dated Aug. 9, 2019, 9 pp.

*Primary Examiner* — Michael S Osinski
(74) *Attorney, Agent, or Firm* — Taft Stettinius & Hollister LLP

(57) ABSTRACT

The disclosed system includes a robot configured to perform a task on a workpiece. A camera having a field of view is operably connected to the robot. A light system is configured to project structured light onto a region of interest having a smaller area within the field of view. A control system is operably coupled to the robot and the camera is configured to determine a depth of the workpiece relative to a position of the robot using the structured light projected onto the workpiece within the region of interest.

24 Claims, 4 Drawing Sheets

(56) References Cited

U.S. PATENT DOCUMENTS

| | | | | |
|---|---|---|---|---|
| 7,724,379 | B2* | 5/2010 | Kawasaki | G01B 11/2509 356/603 |
| 7,957,583 | B2* | 6/2011 | Boca | B25J 9/1697 345/419 |
| 7,957,639 | B2 | 6/2011 | Lee et al. | |
| 8,082,064 | B2* | 12/2011 | Kay | B25J 9/1697 250/208.1 |
| 8,095,237 | B2* | 1/2012 | Habibi | B25J 9/1692 700/245 |
| 8,437,535 | B2* | 5/2013 | Boca | G01S 17/875 382/154 |
| 8,712,678 | B2* | 4/2014 | Takahashi | B60G 15/068 700/112 |
| 8,723,923 | B2 | 5/2014 | Bloom et al. | |
| 8,832,954 | B2 | 9/2014 | Atwell et al. | |
| 8,947,509 | B2 | 2/2015 | Bloom et al. | |
| 8,970,676 | B2 | 3/2015 | Bloom et al. | |
| 9,001,190 | B2 | 4/2015 | Olivier, III et al. | |
| 9,050,728 | B2* | 6/2015 | Ban | B25J 9/1697 |
| 9,256,943 | B2 | 2/2016 | Appia et al. | |
| 9,319,660 | B2* | 4/2016 | Liou | H04N 13/239 |
| 9,393,696 | B2* | 7/2016 | Hayashi | B25J 9/1697 |
| 9,492,923 | B2* | 11/2016 | Wellman | B25J 9/1612 |
| 9,497,442 | B2 | 11/2016 | Russell et al. | |
| 9,507,995 | B2 | 11/2016 | Konolige et al. | |
| 9,606,237 | B2 | 3/2017 | Herschbach et al. | |
| 9,630,321 | B2* | 4/2017 | Bradski | G06T 7/529 |
| 9,696,427 | B2 | 7/2017 | Wilson et al. | |
| 10,020,216 | B1* | 7/2018 | Fujimori | G01B 11/14 |
| 10,108,829 | B2* | 10/2018 | Telling | G06K 7/10405 |
| 10,190,873 | B1* | 1/2019 | Yamagami | G01B 11/02 |
| 10,290,118 | B2* | 5/2019 | Shivaram | G06T 7/74 |
| 10,302,422 | B2* | 5/2019 | Inukai | B25J 9/1697 |
| 10,527,409 | B2* | 1/2020 | Yamauchi | G01B 11/25 |
| 10,569,421 | B2* | 2/2020 | Shino | G01D 5/24457 |
| 2003/0018414 | A1* | 1/2003 | Watanabe | B23Q 7/04 700/259 |
| 2007/0115484 | A1* | 5/2007 | Huang | G01B 11/2504 356/604 |
| 2008/0069435 | A1* | 3/2008 | Boca | G01B 11/25 382/153 |
| 2009/0033655 | A1* | 2/2009 | Boca | B25J 9/1697 345/419 |
| 2009/0097039 | A1* | 4/2009 | Kawasaki | G01B 11/2509 356/603 |
| 2011/0043808 | A1* | 2/2011 | Isozaki | G01N 21/956 356/445 |
| 2012/0056982 | A1 | 3/2012 | Katz et al. | |
| 2012/0113435 | A1* | 5/2012 | Suzuki | G01B 11/2518 356/612 |
| 2012/0218464 | A1 | 8/2012 | Ben-Moshe et al. | |
| 2013/0114861 | A1* | 5/2013 | Takizawa | G06T 7/74 382/106 |
| 2013/0278725 | A1 | 10/2013 | Mannan et al. | |
| 2014/0063192 | A1* | 3/2014 | Sonoda | G01B 11/2513 348/46 |
| 2014/0104416 | A1* | 4/2014 | Giordano | G01N 9/02 348/135 |
| 2014/0120319 | A1 | 5/2014 | Joseph | |
| 2014/0132721 | A1 | 5/2014 | Martinez Bauza et al. | |
| 2014/0192187 | A1* | 7/2014 | Atwell | G01B 11/03 348/136 |
| 2014/0268108 | A1* | 9/2014 | Grau | G01B 11/14 356/72 |
| 2015/0002662 | A1* | 1/2015 | Furihata | H04N 5/2256 348/136 |
| 2015/0062558 | A1 | 3/2015 | Koppal et al. | |
| 2015/0077823 | A1* | 3/2015 | Hashiguchi | G02B 26/0858 359/200.8 |
| 2015/0146215 | A1* | 5/2015 | Kobayashi | G01B 11/2513 356/610 |
| 2015/0217451 | A1* | 8/2015 | Harada | B25J 9/1697 700/253 |
| 2015/0271466 | A1* | 9/2015 | Yamazaki | G06T 7/55 348/46 |
| 2015/0300816 | A1* | 10/2015 | Yang | G01N 21/4738 600/424 |
| 2016/0063309 | A1* | 3/2016 | Konolige | G06K 9/00201 382/153 |
| 2016/0089791 | A1* | 3/2016 | Bradski | H04N 5/33 700/214 |
| 2016/0091305 | A1* | 3/2016 | Yogo | G01B 11/245 348/136 |
| 2016/0150219 | A1* | 5/2016 | Gordon | G06F 3/017 348/46 |
| 2016/0182889 | A1 | 6/2016 | Olmstead | |
| 2016/0253821 | A1* | 9/2016 | Romano | G06T 7/11 382/103 |
| 2016/0330433 | A1* | 11/2016 | Shen | G01S 1/00 |
| 2016/0366397 | A1 | 12/2016 | Lee et al. | |
| 2017/0069052 | A1 | 3/2017 | Li | |
| 2017/0089691 | A1* | 3/2017 | Seki | G06T 7/521 |
| 2017/0124714 | A1* | 5/2017 | Sridhar | B25J 9/1697 |
| 2017/0132784 | A1* | 5/2017 | Yamada | G06T 7/74 |
| 2017/0151672 | A1* | 6/2017 | Ando | B25J 9/1697 |
| 2017/0176178 | A1* | 6/2017 | Inukai | H04N 5/2256 |
| 2017/0236014 | A1* | 8/2017 | Schamp | B60R 1/002 382/103 |
| 2017/0332862 | A1* | 11/2017 | Jun | G05D 1/0274 |
| 2017/0360286 | A1* | 12/2017 | Kaku | A61B 5/0084 |
| 2018/0253863 | A1* | 9/2018 | Wallack | G06T 7/80 |
| 2018/0315205 | A1* | 11/2018 | Moribe | G06T 5/50 |
| 2018/0318051 | A1* | 11/2018 | Lu | G06T 7/00 |
| 2018/0372484 | A1* | 12/2018 | Fujita | G01B 11/2518 |
| 2019/0077013 | A1* | 3/2019 | Yoshida | B25J 9/1692 |
| 2019/0094017 | A1* | 3/2019 | Wakabayashi | G01B 11/254 |
| 2019/0285402 | A1* | 9/2019 | Yamauchi | G01B 11/25 |
| 2019/0320162 | A1* | 10/2019 | Usami | G01B 11/2545 |
| 2019/0389065 | A1* | 12/2019 | Horiguchi | B25J 19/023 |
| 2019/0389068 | A1* | 12/2019 | Shimizu | B25J 11/005 |

FOREIGN PATENT DOCUMENTS

| | | |
|---|---|---|
| CN | 103558850 B | 10/2017 |
| CN | 206568190 U | 10/2017 |
| EP | 2728374 B1 | 12/2016 |
| WO | 2017180003 A2 | 10/2017 |

* cited by examiner

DEPTH SENSING ROBOTIC HAND-EYE CAMERA USING STRUCTURED LIGHT

TECHNICAL FIELD

The present application generally relates to a robotic hand-eye camera having a field of vision, a control system operable for determining a region of interest within the field of vision and a light system for projecting structured light onto an object located within the region of interest.

BACKGROUND

Robots can be used with a camera system to determine a location of a work object relative to the robot. Typically, an entire field of view or "scene" is illuminated with one or more light sources to aid depth sensing of the camera. Some existing systems have various shortcomings relative to certain applications. Accordingly, there remains a need for further contributions in this area of technology.

SUMMARY

One embodiment of the present application is a unique system for sensing a location of an object in a robot work area or industrial scene. Other embodiments include apparatuses, systems, devices, hardware, methods, and combinations for sensing a location of an object relative to the robot using a camera system with structured light projected only on a portion of the field of view. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
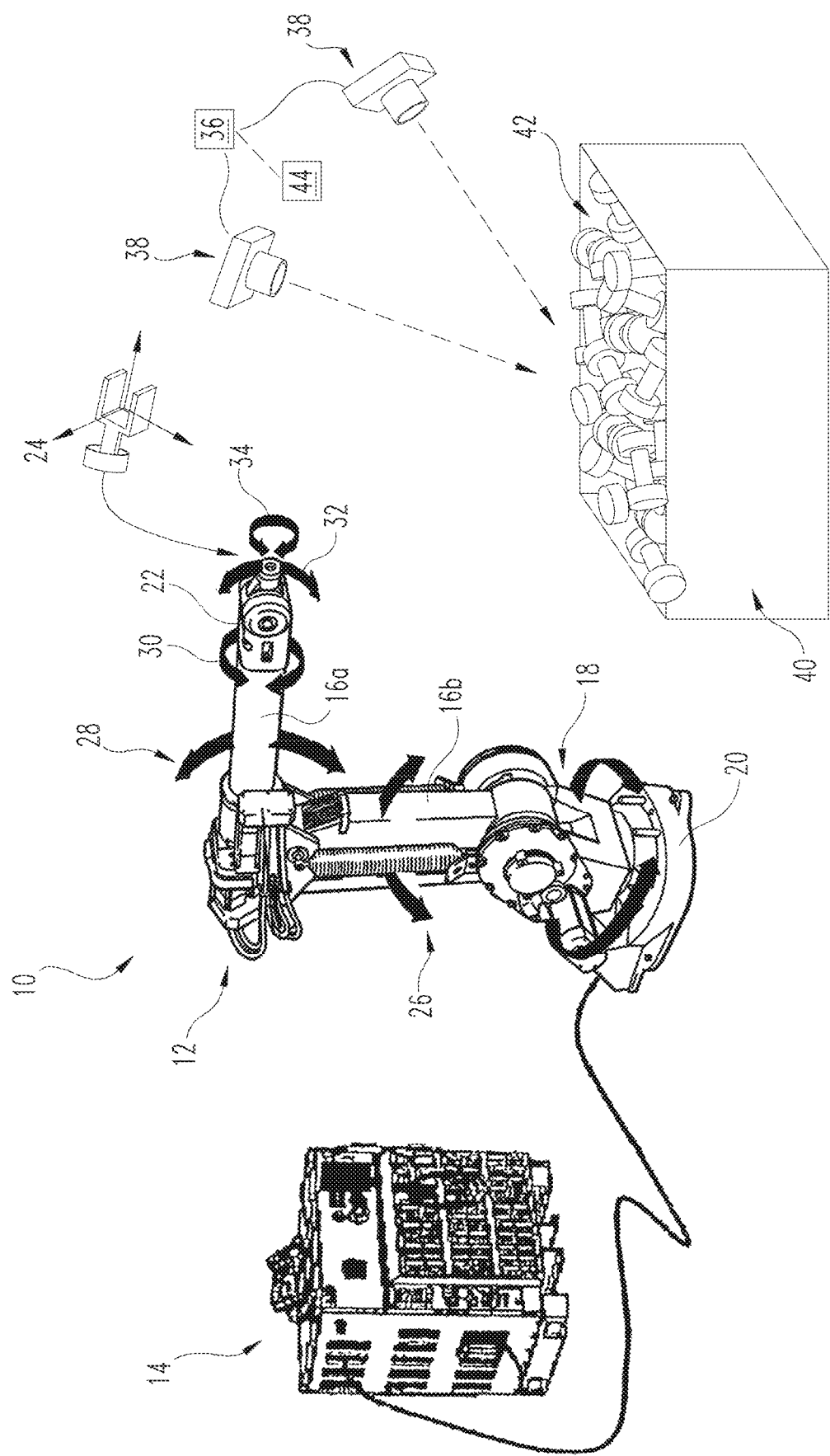
FIG. 1 is a schematic illustration of a robot system according to one exemplary embodiment of the present disclosure.

For the purposes of promoting an understanding of the principles of the application, reference will now be made to the embodiments illustrated in the drawings and specific language will be used to describe the same. It will nevertheless be understood that no limitation of the scope of the application is thereby intended. Any alterations and further modifications in the described embodiments, and any further applications of the principles of the application as described herein are contemplated as would normally occur to one skilled in the art to which the application relates.

Structured light systems can be used to enable a computerized control system to measure shape and position of three-dimensional (3D) objects. A structured light system includes a light source and a pattern generator. A camera can measure the appearance of the light patterns and light pattern variation projected onto the objects. The observed phase of a periodic light pattern is related to the topography or depth of the object that is being illuminated. The variation in light patterns can include variation in shapes, shades, intensities, colors, wavelengths and/or frequencies of the projected light.

As the field of robotics continues to advance, an increasing amount of focus is placed on the development of technologies that permit the robot to perform tasks quicker and with less computation requirements. Typically, structured light is projected onto or across the entire field of view of a vision system to aid a robot system in determining position and depth of one or more objects within the field of view. Structured light interference can be problematic if the field of view from multiple stereo cameras happen to overlap. Moreover, calculating depth based on image analysis of the entire field of view is computationally intensive. For these reasons, real-time 3D camera applications typically rely on fast, less accurate algorithms that require higher power and more expensive computer systems. The present disclosure provides a method to reduce computation time, reduce the chance for light reflection interference within the vision system, and reduce the potential of eye injuries due to wide reaching array of light projection.

Referring now to FIG. 1, an illustrative robot system 10 is shown in an exemplary working environment or industrial scene. It should be understood that the robot system shown herein is exemplary in nature and that variations in the robot and/or industrial scene is contemplated herein. The robot system 10 can include a robot 12 with a vision system 36 having one or more cameras 38. In one form, one or more of the cameras 38 can be mounted on one of the moveable arms 16a, 16b of the robot 12. In other forms, one or more cameras 38 may be positioned apart from the robot 12. A control system 14 including an electronic controller with a CPU, a memory, and input/output systems is operably coupled to the robot 12 and to the vision system 36. The control system 14 is operable for receiving and analyzing images captured by the vision system 36 and other sensor data used for operation of the robot 12. In some forms, the control system 14 is defined within a portion of the robot 12.

The robot 12 may include a movable base 20 and a plurality of movable portions connected thereto. The movable portions may translate or rotate in any desired direction. By way of example and not limitation, movable portions illustrated by arrows 18, 26, 28, 30, 32 and 34 may be employed by the exemplary robot 12. A bin 40 for holding workpieces or other objects 42 to be retrieved and/or worked on by the robot 12 may constitute at least a part of the exemplary industrial scene. An end effector 24 such as a gripping or grasping mechanism can be attached to the moveable arm 16a and used to grasp an object 42 and/or perform other work tasks on the object 42 as desired. It should be understood that the term "bin" is exemplary in nature and as used herein means, without limitation, any container, carton, box, tray or other structure that can receive and/or hold workpieces, parts or other objects. Additional components 44 can be associated with the vision system 36. These components 44 can include lighting systems, reflector(s), refractor(s), diffractive element(s) and beam expander(s) or the like.

Figure 2:
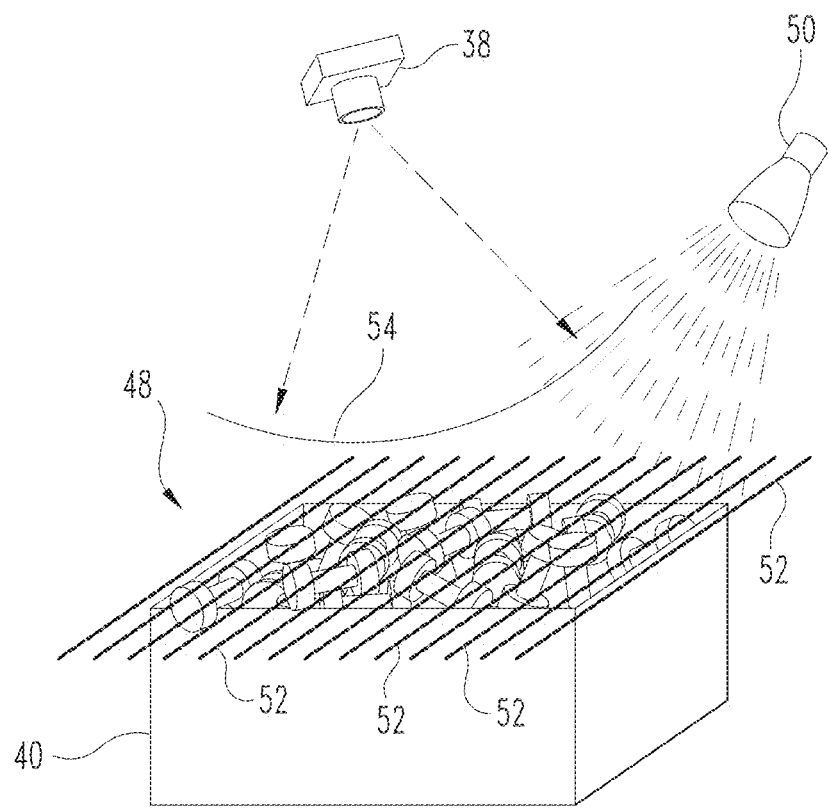
FIG. 2 is a prior art schematic illustration of structured light being projected onto an entire work area or field of vision of a camera.

Referring now to FIG. 2, a robot scene 48, according to a prior art embodiment, is illustrated wherein the work bin 40 can be a portion of the industrial robot scene 48 or the entirety of the industrial robot scene 48. A light source 50, such as a laser or other known lighting source, can project structured light into the industrial robot scene 48 so that an entire or complete field of view 54 of a camera 38 is filled with structured light 52 illustrated in the exemplary embodiment as dashed parallel lines. The field of view 54 of the camera 38 can include a portion of the entire industrial robot scene 48 or the entire industrial robot scene 48, however the computational time delay of analyzing all objects 42 within the field of view 54 is time consuming and can be challenging in a real-time robot work process.

Figure 3:
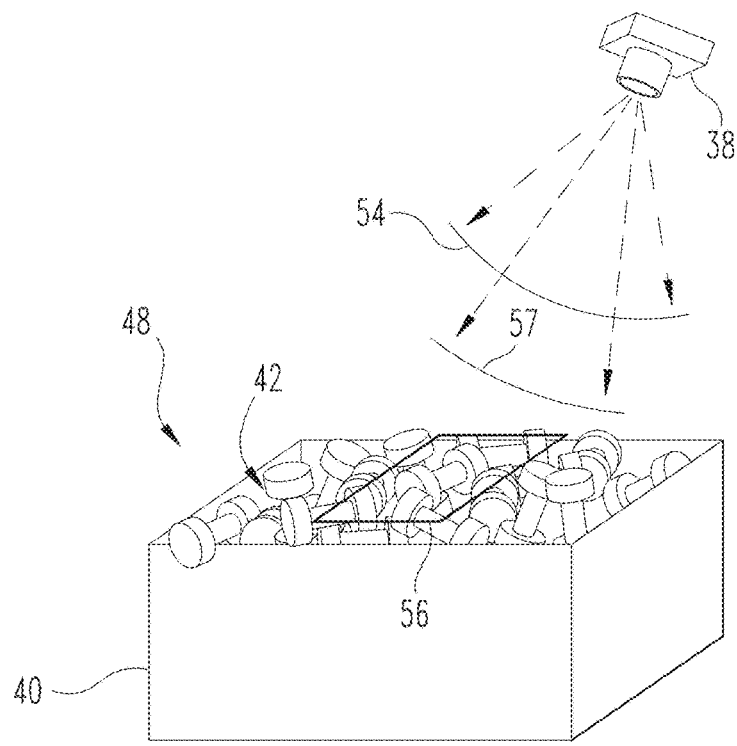
FIG. 3 a schematic illustration of a region of interest located in portion of the field of vision of the camera as determined by a control system.
Figure 4:
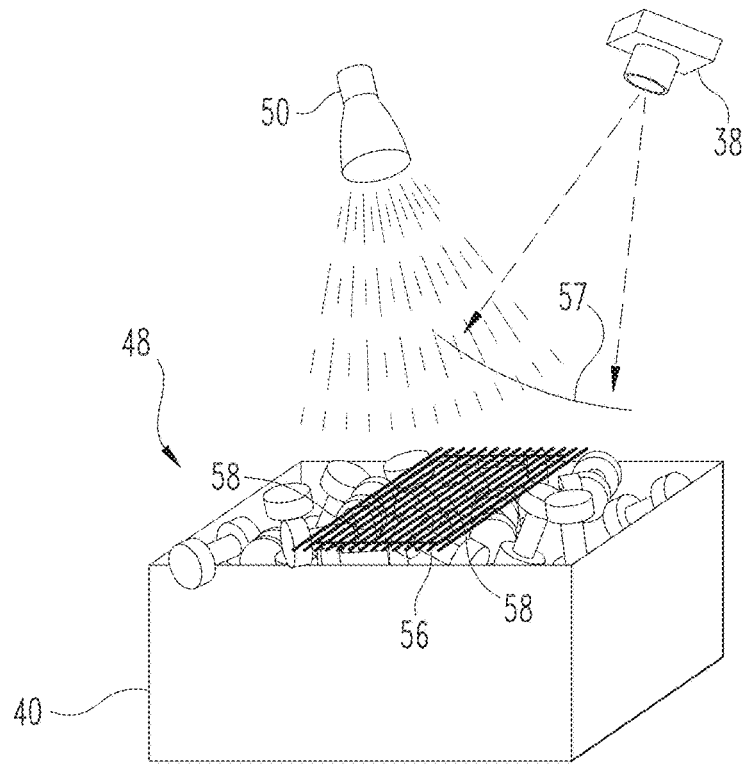
FIG. 4 is a schematic illustration of structured light being projected onto the region of interest for facilitating robot interaction with an object in the region of interest.

Referring now to FIG. 3, a system for reducing a computational time of the control system 14 required to analyze the objects 42 within the field of view 54 is illustrated. The control system 14 is operable to determine a region of interest 56 illustrated by a box shaped pattern covering only a portion of the objects 42 positioned within the entire field of view 54. Once the region of interest 56 is determined by the control system 14, structured light 58 can be projected from a light source 50 into the region of interest 56, as shown in FIG. 4. The control system 14 need only analyze one or more objects 42 in the region of interest 56 defined by a portion of the field of view 54. The region of interest 56 illuminated by structured light 58 illustrated by linear line segments can be captured by a camera 38 of the vision system 36. The control system 14 then analyzes the captured image(s) and determines location and depth of one or more objects 42 within the region of interest 56. In this manner, computational analysis requirements for the control system 14 is reduced and therefore the speed in which the robot system 10 can perform a work task on an object 42 within a region of interest 56 will increase.

In one form, the structured light system can project a pattern of light onto the region of interest 56 and the control system 14 can compare certain features of the pattern in a captured image with locations of the features in a reference image to determine disparities that can be used to determine depth at each location. The region of interest 56 can be illuminated by a time-multiplexed sequence of patterns. Typically, two or more patterns are used to reconstruct a 3D image with sufficiently high resolution. For example, in order to acquire 20 depth frames per second (fps), a light projector 50 must be able to project patterns at a sufficiently rapid rate—typically greater than sixty (60) fps. Various light projectors may be used such as for example, laser generators, computer controlled projectors based on LCD (liquid crystal diode), DMD (digital micro mirror device) or LED (light emitting display) and the like. In one form, the structured light 58 may be a light pattern of parallel bars having various codes and the image may comprise a plurality of pixels that corresponds to the plurality of parallel bars of light. Other forms are contemplated herein.

Figure 5:
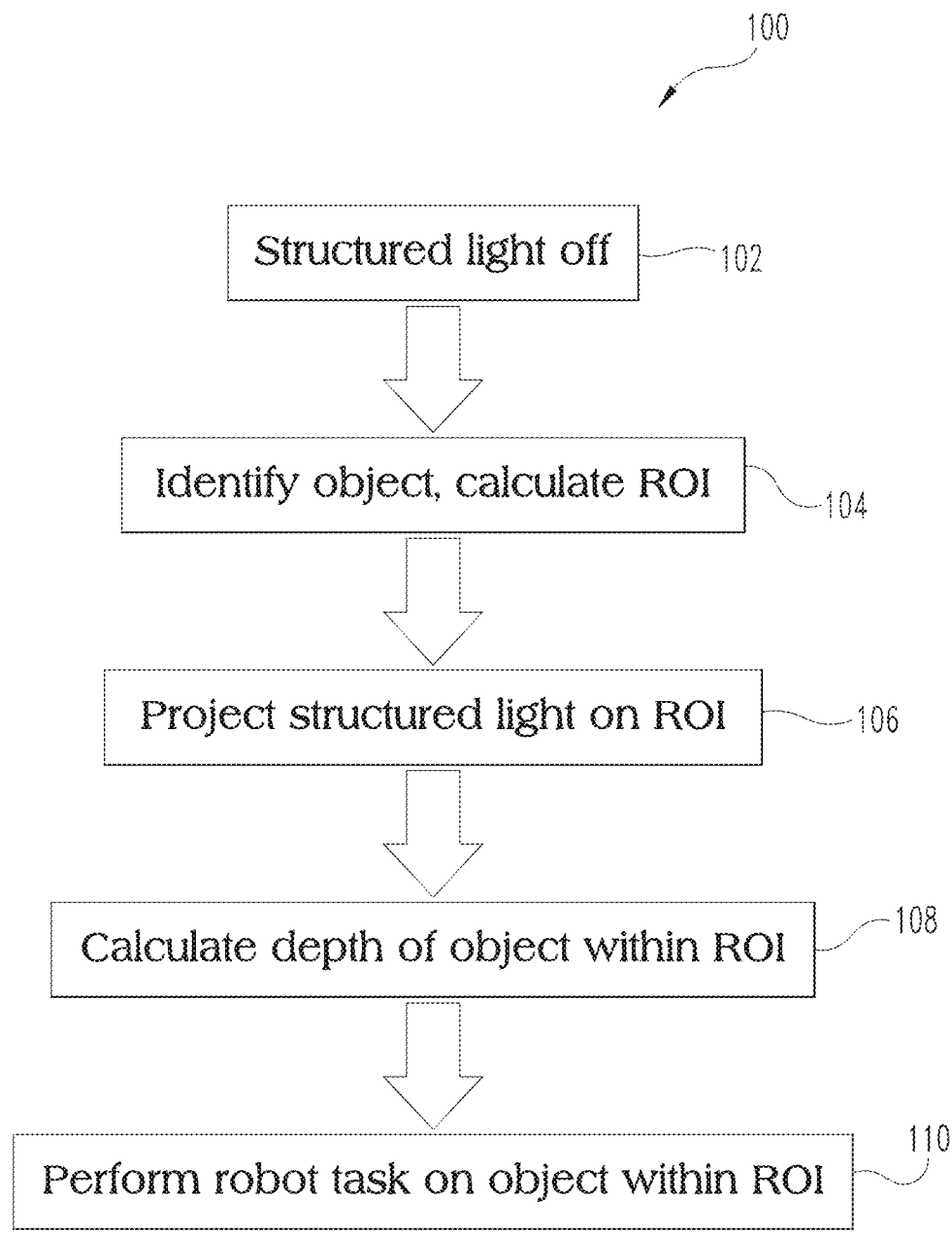
FIG. 5 is a flow chart illustrating a method of operation.

Referring now to FIG. 5, a method 100 is disclosed for performing a work task on an object 42 using structured light 58 to aid in determining a position and depth of an object 42. At step 102, the structured light 58 is turned off. At step 104 the control system 14, including the vision system 36, identifies an object 42 and calculates a region of interest 56 within a field of view 54. The light source 50 then projects structured light 58 onto the region of interest 56 at step 106. At step 108, the control system 14 will calculate a location and depth of an object 42 within a region of interest 56 using only the pixels circumscribed by the bounding box defining the region of interest 56. At step 110, the robot 12 performs a robot task on an object 42 within a region of interest 56. Robot tasks can include, but are not limited to, grasping, moving, assembling or performing other work operations on the object 42. It should be understood that when the term robot, robot task, robot system or the like is used herein, the system is not limited to a single robot, but on the contrary may include multiple robots operating in the industrial scene.

In one aspect, the present disclosure includes a system comprising a robot configured to perform a robot task; a vision system including a camera operably connected to the robot, the camera operable to capture an image within a field of view; a controller operable for analyzing the image and determining a region of interest within the field of view; a light system configured to project structured light onto the region of interest; and wherein the control system is configured to determine a depth of a workpiece within the region of interest.

In refining aspects, wherein the region of interest has a smaller area than the field of view of the camera, wherein the control system determines a depth of a plurality of workpieces within the region of interest, wherein the structured light is defined by at least one of a plurality of patterns, shapes, shades, intensities, colors, wavelengths and/or frequencies, wherein the vision system includes one or more 3D cameras, wherein light system includes one or more laser beams projected onto the region of interest, further comprising a reflector positioned in a path of at least one of the laser beams, further comprising a refractor positioned in a path of at least one of the laser beams, further comprising an diffractive element positioned in a path of at least one of the laser beams, wherein the control system guides movement of the robot based on scanned images of workpieces within the region of interest and wherein at least a portion of the structured light projects from the robot.

Another aspect of the present disclosure includes a method comprising: scanning an industrial robot scene with at least one image sensor having a field of view; storing image data from the image sensor in a memory; analyzing the image data; determining a region of interest within the image data, wherein the region of interest has a smaller area than an area of the field of view; projecting structured light onto the region of interest; determining a depth of an object located within the region of interest based on analysis of the object illuminated by the structured light; transmitting the depth information to a controller operably coupled to a robot; and performing a task on the object with the robot.

In refining aspects, the method includes wherein the at least one image sensor is a camera, wherein the camera is a 3D video camera, wherein the projecting of structured light includes a laser beam projection, wherein the structured light is projected in different patterns, shapes, shades, intensities, colors, wavelengths and/or frequencies onto the region of interest and wherein the task includes gripping the object with a robot gripper.

Another aspect of the present disclosure includes a system comprising: an industrial scene that defines a work area for a robot; a vision system having a field of view in the industrial scene; a control system operably coupled to the robot, the control system configured to receive and analyze data transmitted from the vision system; means, with the control system, for determining a region of interest within a portion of the field of view; a light system configured to direct a structured light onto the region of interest; and means, with the control system, for determining a position and depth of an object within the region of interest relative to the robot.

In refining aspects, wherein the control system provides operational commands to the robot, wherein the light system includes a laser, wherein the structured light includes a variable output including one of a light pattern variation, light shape variation, light shade variation, light intensity variation, light color variation, light wavelength variation and/or light frequency variation, wherein the vision system includes a 3D camera, wherein portions of the vision system and the light system are mounted on the robot and wherein the robot performs a work task on the object based on controller analysis of the object having structured light projected thereon.

While the application has been illustrated and described in detail in the drawings and foregoing description, the same is to be considered as illustrative and not restrictive in character, it being understood that only the preferred embodiments have been shown and described and that all changes and modifications that come within the spirit of the applications are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A system comprising:
   a robot configured to perform a robot task;
   a vision system including a camera operably connected to the robot, the camera operable to capture an image within a field of view;
   a controller operable for analyzing the image and determining a region of interest within the field of view, the controller also operable for analyzing the image to identify an object within the region of interest;
   a light system configured to selectively project structured light onto the region of interest; and
   wherein the controller is configured to determine a depth of a workpiece within the region of interest;
   wherein the controller is structured to:
      configure the light system in an OFF condition such that structured light is not projected onto the region of interest;
      identify the object within the region of interest from an image captured while the light system is in the OFF condition;
      configure the light system in an ON condition such that structured light is projected onto the region of interest;
      calculate the depth of the workpiece within the region of interest from an image captured while the light system is in the ON condition.

2. The system of claim 1, wherein the region of interest has a smaller area than the field of view of the camera.

3. The system of claim 1, wherein the controller determines a depth of a plurality of workpieces within the region of interest.

4. The system of claim 1, wherein the structured light is defined by at least one of a plurality of patterns, shapes, shades, intensities, colors, wavelengths and/or frequencies.

5. The system of claim 1, wherein the vision system includes one or more 3D cameras.

6. The system of claim 1, wherein light system includes one or more laser beams or coded light projected onto the region of interest.

7. The system of claim 6 further comprising a reflector positioned in a path of at least one of the laser beams.

8. The system of claim 6 further comprising a refractor positioned in a path of at least one of the laser beams.

9. The system of claim 6 further comprising a diffractive element positioned in a path of at least one of the laser beams.

10. The system of claim 1, wherein the controller guides movement of the robot based on scanned images of workpieces within the region of interest.

11. The system of claim 1, wherein at least a portion of the structured light projects from the robot.

12. A method comprising:
   scanning an industrial robot scene with at least one image sensor having a field of view;
   storing image data from the image sensor in a memory;
   analyzing the image data;
   determining a region of interest within the image data, wherein the region of interest has a smaller area than an area of the field of view;
   identifying an object within the region of interest when structured light is not projected onto the region of interest;
   selectively projecting structured light onto the region of interest;
   determining a depth of the object located within the region of interest based on analysis of the object illuminated by the structured light;
   transmitting depth information to a controller operably coupled to a robot; and
   performing a task on the object with the robot.

13. The method of claim 12, wherein the at least one image sensor is a camera.

14. The method of claim 13, wherein the camera is a 3D video camera.

15. The method of claim 12, wherein the projecting of structured light includes a laser beam projection.

16. The method of claim 12, wherein the structured light is projected in different patterns, shapes, shades, intensities, colors, wavelengths and/or frequencies onto the region of interest.

17. The method of claim 12, wherein the task includes gripping the object with a robot gripper, and wherein the identifying occurs before the projecting.

18. A system comprising:
   an industrial scene that defines a work area for a robot;
   a vision system having a field of view in the industrial scene;
   a control system operably coupled to the robot, the control system configured to receive and analyze data transmitted from the vision system;
   means, with the control system, for determining a region of interest within a portion of the field of view;
   a light system configured to selectively direct a structured light onto the region of interest;
   means, with the control system, for identifying an object within the region of interest when structured light is not directed onto the region of interest; and means, with the control system, for determining a position and depth of the object within the region of interest relative to the robot when structured light is directed onto the region of interest.

19. The robot of claim 18, wherein the control system provides operational commands to the robot.

20. The robot of claim 18, wherein the light system includes a laser.

21. The robot of claim 18, wherein the structured light incudes a variable output including one of a light pattern variation, light shape variation, light shade variation, light intensity variation, light color variation, light wavelength variation and/or light frequency variation.

22. The robot of claim 18, wherein the vision system includes a 3D camera.

23. The robot of claim 18, wherein portions of the vision system and the light system are mounted on the robot.

24. The robot of claim 18, wherein the robot performs a work task on the object based on controller analysis of the object having structured light projected thereon.

\* \* \* \* \*